United States Patent
Mitchell et al.

(10) Patent No.: US 7,006,013 B2
(45) Date of Patent: Feb. 28, 2006

(54) SYSTEM AND METHOD FOR VISUALLY INDICATING RECEIPT OF A RADIO COMMUNICATION DIRECTED TO A UNIQUELY IDENTIFIED VEHICLE

(76) Inventors: Robert P. Mitchell, 2226 Warrenton Way, Jacksonville, NC (US) 28546; Wayne C. Crouch, 110 E. Park, Edwardsville, IL (US) 62025; Martin J. Foley, 805 S. Hudson Ave., Pasadena, CA (US) 91106

( * ) Notice: Subject to any disclaimer, the term of this patent is extended or adjusted under 35 U.S.C. 154(b) by 0 days.

(21) Appl. No.: 10/895,730

(22) Filed: Jul. 20, 2004

(65) Prior Publication Data

US 2004/0263381 A1    Dec. 30, 2004

Related U.S. Application Data

(63) Continuation of application No. 10/095,607, filed on Mar. 11, 2002, now abandoned, which is a continuation of application No. 09/466,680, filed on Dec. 20, 1999, now Pat. No. 6,356,209.

(51) Int. Cl.
    *G08B 21/00*    (2006.01)
(52) U.S. Cl. .................. 340/945; 345/961; 345/971; 345/426.15; 455/108; 455/11.1
(58) Field of Classification Search ................ 455/108, 455/11.1; 340/945, 961, 971, 426.26, 426.15, 340/426
See application file for complete search history.

(56) References Cited

U.S. PATENT DOCUMENTS

| | | | |
|---|---|---|---|
| 4,959,850 A * | 9/1990 | Marui ......................... | 455/563 |
| 5,448,768 A * | 9/1995 | Zinser ......................... | 455/108 |
| 5,553,312 A * | 9/1996 | Gattey et al. .............. | 455/11.1 |
| 5,714,948 A * | 2/1998 | Farmakis et al. ........... | 340/961 |
| 5,801,616 A * | 9/1998 | Ghazarian et al. ..... | 340/426.36 |

* cited by examiner

*Primary Examiner*—Daniel Wu
*Assistant Examiner*—Tai T. Nguyen
(74) *Attorney, Agent, or Firm*—Sonnenschein Nath & Rosenthal LLP

(57) ABSTRACT

A system for visually indicating receipt of a radio communication directed to a user having an associated unique identification code. The system includes a radio transponder having an audio output, means for obtaining and storing the unique identification code; a speech recognition circuit operably connected to the radio transponder audio output and the stored identification code; and a visual indicator operably connected to an output of the speech recognition circuit, such that when the stored identification code and said audio input are substantially the same the visual indicator is driven to activation. A method is similarly disclosed.

1 Claim, 3 Drawing Sheets

SYSTEM AND METHOD FOR VISUALLY INDICATING RECEIPT OF A RADIO COMMUNICATION DIRECTED TO A UNIQUELY IDENTIFIED VEHICLE

RELATED APPLICATION DATA

The present application is a continuation of copending application Ser. No. 10/095,607, filed Mar. 11, 2002, now abandoned, which was a continuation of patent application Ser. No. 09/466,680, filed Dec. 20, 1999, now U.S. Pat. No. 6,356,209, issued Mar. 12, 2002, which is incorporated herein by reference to the extent permitted by law.

FIELD OF THE INVENTION

This invention relates to communication systems, and in particular to a system and method for providing a visual indication of a radio communication directed to a unique identified vehicle. This system and method having particular utility in aircraft and ground test equipment.

BACKGROUND ART

The air space is a busy place, especially near airports or other landing strips, for both pilots and air-traffic controllers. As the air traffic becomes increasingly populated, controllers must efficiently and systematically give instructions via radio to pilots in that heavily populated air space. Similarly, pilots rely on the radio transmissions from the air traffic controllers as a means of increasing safety.

There may be many reasons why a pilot might not clearly receive radio instructions from air traffic controllers such as workload, cockpit noise, weather, other closely spaced aircraft, or any number of other reasons. If the pilot-air traffic controller communications routine is disrupted because a pilot missed a radio instruction, then multiple errors can occur. Not only are there delays because the controller has to repeat his instructions, but other aircraft are vulnerable because that one pilot did not receive instructions in a timely fashion.

Many inventions have addressed this and similar problems. For instance, U.S. Pat. No. 4,369,425 to Anderson et al. teaches a pilot unique transmission radio frequency signal to communicate with the air traffic controllers. The prior art also describes various methods of warning pilots of faulty conditions. U.S. Pat. No. 2,259,123 to Wells et al described a complex system for aircraft instrumentation where a unitary panel of lights would show at a glance, all the aircraft instruments status. U.S. Pat. No. 2,337,535 to Acs Jr., describes a visual warning system activated by an abnormal condition in the aircraft instrument panel. In U.S. Pat. No. 3,582,949 to Forst, discloses an audiovisual warning system activated as a result of a monitored condition in fault. Unfortunately, none of the prior art has sought to exploit the idea of a redundant visual indication to uniquely identify a transmission from air traffic controllers to a given aircraft.

There have been various in home applications of audio signals driving a visual indication. In U.S. Pat. No. 3,798,638 to Goldschmied, an audio responsive display where the lights are modulated to the audio signal is described. In U.S. Pat. No. 3,890,381 to Hopkins, a system for energizing a lamp upon receipt of predetermined acoustic signals such as telephones or alarm clocks is described. These systems employ fixed circuits that cannot be programmed or changed without physically adjusting the receiving circuit components.

SUMMARY OF THE INVENTION

Essentially, the prior art does not address let alone sufficiently solve the problem of a pilot missing radio instructions from an air traffic controller. The prior art does not teach the idea of using the pilot unique, existing call sign from the radio output to activate a visual indication which results in a redundant method of notifying a pilot of an air traffic controller instruction. Also, none of the prior art teaches the idea of a programmable call activated system whereby any aircraft can have a qualified person set or change the unique call sign. Additionally, the prior art does not teach the idea that fixed ground test equipment or portable ground test or monitoring systems could also be programmed to be call activated in the same fashion as the aircraft system previously described.

These and other objects and features of the present invention will become apparent to those skilled in the art in light of the following disclosure and accompanying drawings.

DESCRIPTION OF THE PREFERRED EMBODIMENT

Figure 1:
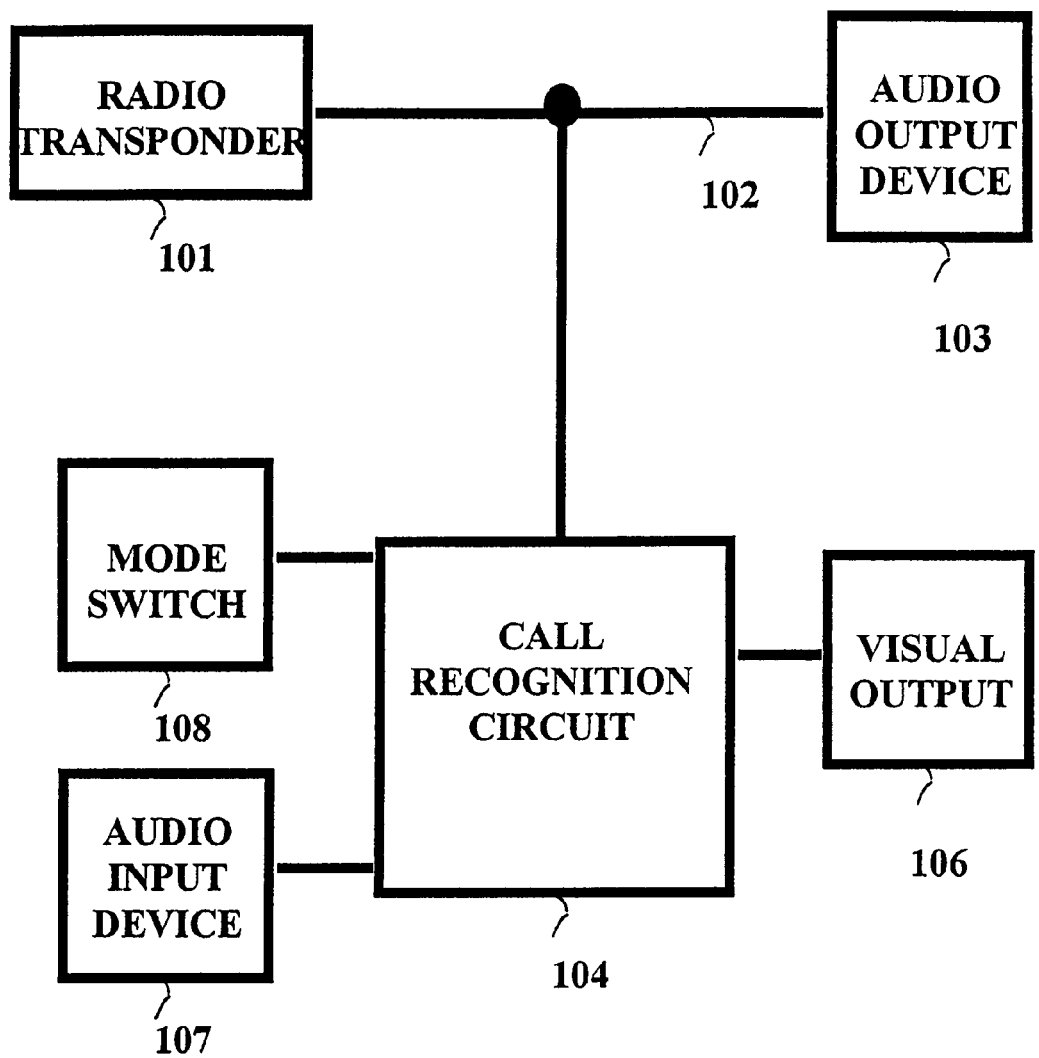
FIG. 1 is a block diagram of a preferred embodiment of an aircraft visual indicating system.

While the present invention may be embodied in many different forms, there is shown in the drawings and discussed herein a few specific embodiments with the understanding that the present disclosure is to be considered only as an exemplification of the principles of the invention and is not intended to limit the invention to the embodiments illustrated.

Modern aircraft utilize a transponder to transmit and receive radio frequency (RF) signals from the ground or control tower. As illustrated by the block diagram in FIG. 1, the aircraft visual indicating system 100 includes a radio transponder 101, a transponder audio line 102, audio output device 103, mode switching means 108, audio input device 107, call recognition circuit 104 and visual display 106. It is contemplated that the aircraft visual indicating system 100 will use the radio transponder, transponder audio line, and audio output device already found in most modern day aircraft and ground test equipment and consequently be retrofitted thereto. Alternatively, though, the aircraft visual indicating system 100 can be produced as a specific unit including all of the requisite components.

Radio transponder 101 may be any commercially available radio transponder rated for aircraft use, such as King model KT76C, Terra model TRT250D, Narco model AT-150, Garmin model GTX320, or Rockwell Collins model RTU-4200. Some of these transponders have associated microphones which accept vocal input from the pilots. These transponders are connected by means known by those skilled in the art to an audio panel. The audio panel generally will also house one or more audio output devices such as a speaker and a headset jack. This audio panel may be any audio panel rated for use in commercial aircrafts such as King model KMA-24, Terra model TMA-350D, Apollo model SL1O or Garmin model GMA340. The audio output device can be a speaker, but is commonly a pilot headset.

Ground test or monitoring equipment such as hand held transceivers or aviation scanners (not shown) would similarly include the radio transponder 101, the transponder audio line 102, and audio device 103 shown in FIG. 1. For instance, hand held transceivers currently used in the industry are ICOM model IC-A4 or Communications Specialists model TR70, however, any hand held transceiver may benefit from the advantages provided by the present invention. The aviation scanners used in the industry are Bearcat Aviation Uniden model BC350A or model BC120XLT.

As shown in FIG. 1, the input of the call recognition circuit 104 is operably connected to the transponder output audio line 102 from the radio transponder 101. As shown in the preferred embodiment of FIG. 1, audio input device 107—which preferably comprises a microphone—is operably connected to a second input of call recognition circuit 104. Alternatively, in embodiments where the radio transponder has an associated audio input device, that input device can be used in place of audio input device 107.

Visual display 106 is connected to an output of call recognition circuit 104. The visual display device may comprise one or more devices known by those skilled in the art that provide a visual indication to a human being, including lamps, LED's, and graphical displays. The visual display may be mounted in a variety of locations. For instance, in aircraft applications, visual display 106 can be located in the cockpit, including incorporating same into the instrument panel, physically attaching it to a pilot's helmet, or incorporating same into a heads up display. In ground test equipment applications, the visual display can be included in the existing package, attached or otherwise physically associated with the test equipment packaging/housing.

The mode switching means 108 is operably connected to the call recognition circuit 104 and is used to toggle between either a set up or operation mode. As is known in the art, mode switching means can be a mechanical switch, touch switch, computer-controlled status or any other mechanism for selecting between modes.

The initialization of the system begins by switching to setup mode. Among other possible operations, "setup mode" enables the aircraft's unique call sign (i.e. N721A, WH2238, United 310 Heavy) to be entered and stored in call recognition circuit 104. In a preferred approach, a qualified person performs this function by reading the call sign into the audio input device. However, it is also contemplated that the call sign could be "keyed in" or selected from a software display pull-down menu (or other graphical means) by using a mouse or similar pointing device. The operation of the system continues by switching to the operation mode where the call recognition circuit monitors the audio line 102 for the correct call sign.

Figure 2A:
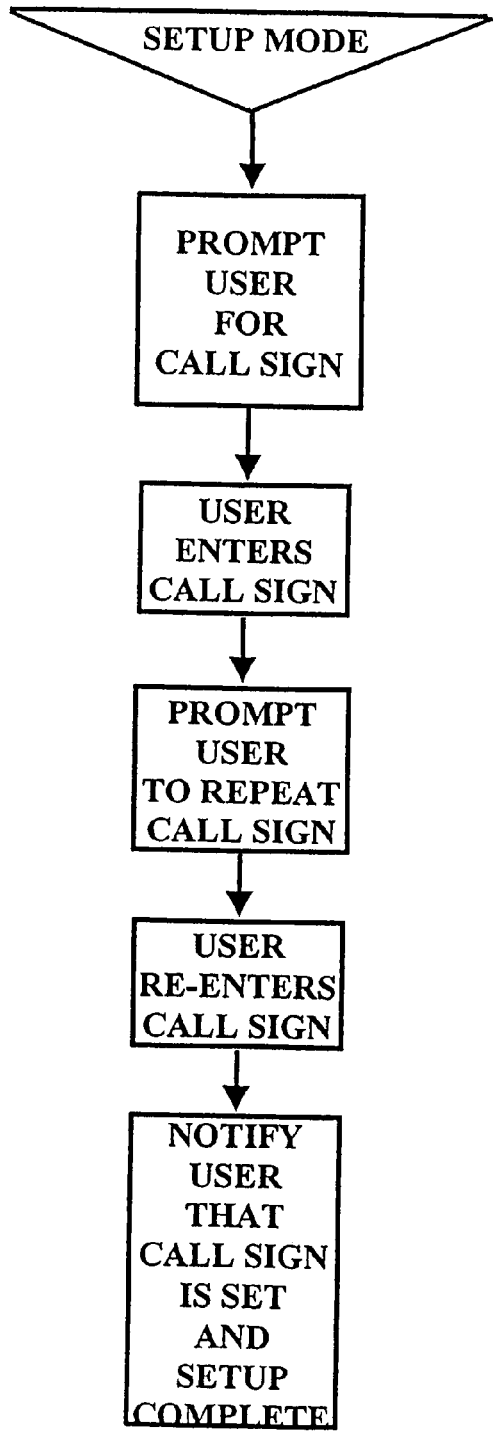
FIGS. 2A and 2B are logic flow diagrams depicting the operation of an aircraft visual indicating system.

FIG. 2A describes the setup mode of call recognition circuit 104. First, the call recognition circuit prompts (visually or orally) the qualified person (through the audio output device 103) to enter the aircraft's specific call sign. The qualified person then "inputs" the correct call sign into the call recognition circuit via audio input device 107, keyboard, or other user input device. In a preferred embodiment, the call recognition circuit then repeats the prompt sequence (visually or orally) to verify the stored call sign. The qualified person is notified by audio output device 103, by visual output device 106, or by a combination of the two that the setup is complete. The qualified person can now change the system mode via mode switching means 108 to the operation mode.

Figure 2B:
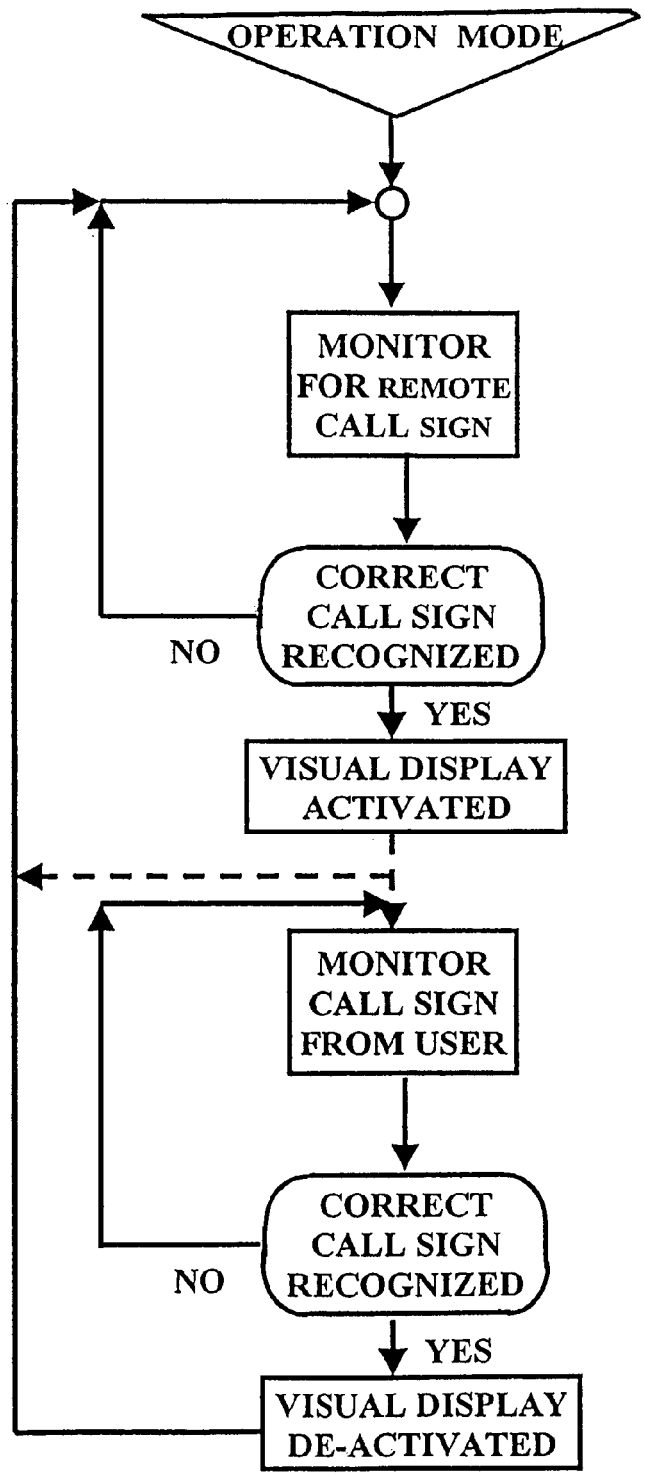

In the operation mode, as shown in FIG. 2B, call recognition circuit 104 (FIG. 1) listens for a radio transmission that contains a call sign that matches the stored call sign. Once the call sign is detected, an output signal is sent to visual display 106 (shown in FIG. 1).

Figure 3:
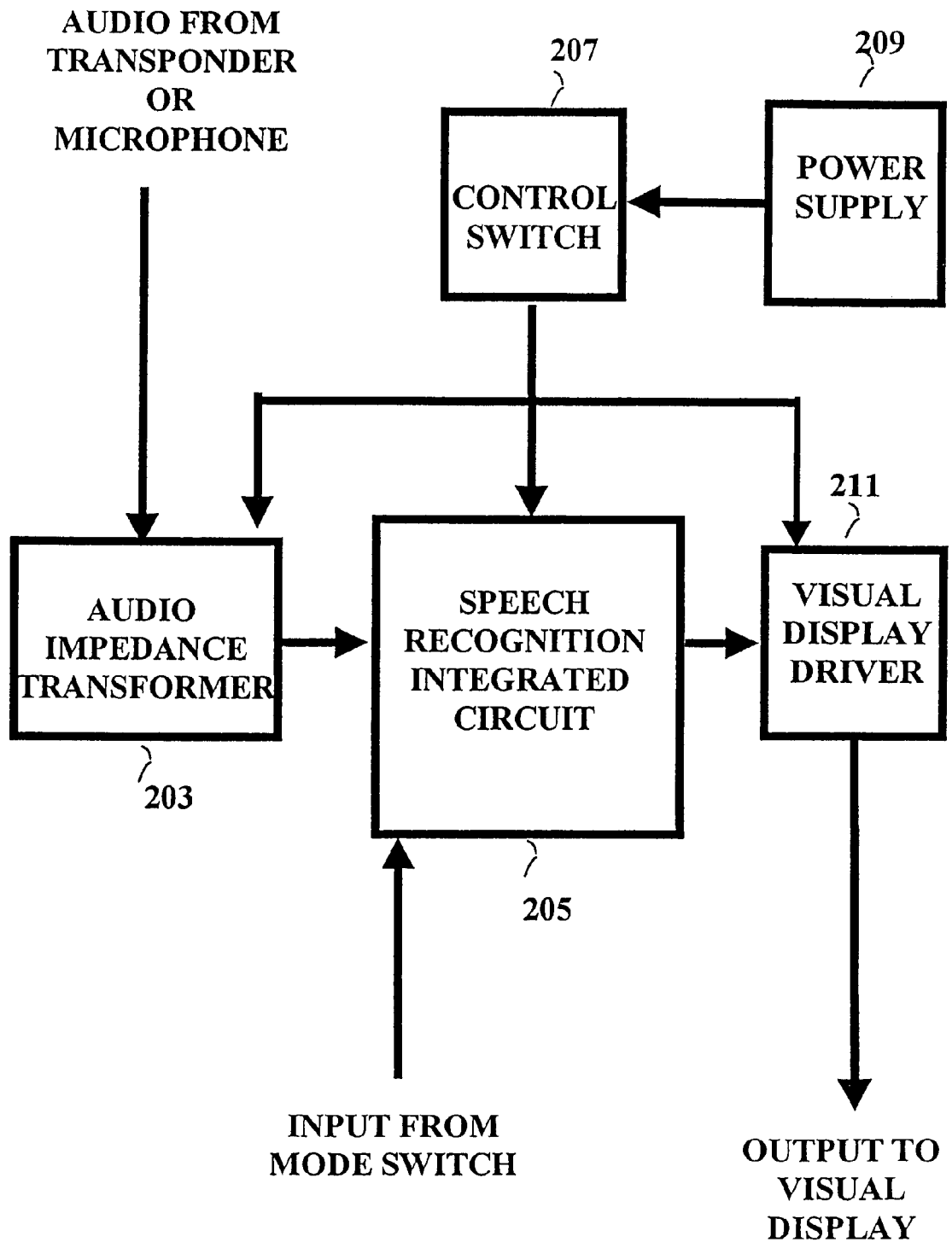
FIG. 3 is a block diagram of the call recognition circuit of the aircraft visual indicating system.

The detailed layout of the call recognition circuit 104 (FIG. 1) is shown in FIG. 3. A commercially available speech recognition integrated circuit such as Sensory Circuits, Inc. RSC 164 or Images Company HM 2007 known by those skilled in the art functions as speech recognition circuit 205. Such a circuit is adaptable to this type of application and information about it is readily available from the manufacturer. The power control switch 207 is used to control power from the power supply 209 to the speech recognition circuit 205, the audio impedance transformer 203, and the visual display driver 211. The audio from the transponder or microphone is connected to the audio impedance transformer 203 which is used to pre-condition the audio signal for the speech recognition circuit 205. When activated, the speech recognition circuit 205 outputs a signal to the visual display driver 211 which provides signal conditioning and can optionally include a predetermined time circuit that provides the visual output signal. The time circuit will allow the visual display 106 of FIG. 1 to be illuminated for any desired length of time. In addition, the time the visual indication is provided could alternatively be tied to the vocal response from the user. In particular, if an air traffic controller sends an instruction, including the programmed aircraft call sign, a visual indicator would be activated by call recognition circuit 104. In response, the pilot confirming receipt of the instruction would repeat the instruction into audio input device along with his call sign. This repetition of the call sign from a local audio source would, in turn, shut off the visual indicator. Similarly, a manual switch, such as a momentary contact switch could be used to shut-off the visual display.

Referring to FIG. 1, the identification is programmed by entering setup mode as selected by mode switching means 108 by a qualified person who provides the desired call pattern. Once the setup is completed, the mode switching means 108 can be switched to the operation mode. In this mode, the speech recognition circuit 205 of FIG. 3 monitors the audio speech patterns from the radio transponder and audio input device. Detailed operation of the speech recognition circuit 205 can be found in the manufacturer's literature and is readily available. If the transmitted speech pattern matches the desired speech pattern of the stored call sign, then the speech recognition integrated circuit 205 provides an output signal that is sent to visual display 106 of FIG. 1 via the visual display driver 211 of FIG. 3 to warn the pilot of an instruction. In this manner, fewer radio instructions will be missed by the pilot.

The foregoing description and drawings merely explain and illustrate the invention and the invention is not limited thereto. Those of the skill in the art who have the disclosure before them will be able to make modifications and variations therein without departing from the scope of the present invention. For instance, it would be apparent to those of skill in the art having the present specification and claims to incorporate this system into an emergency vehicle, such as a police car and perhaps even utilize the pre-existing emergency lights to indicate receipt of directed radio instruction when the police officers are outside the police car.

What is claimed is:

1. A system for visually indicating receipt of a radio communication directed to a user having an associated unique identification code, said system comprising:

a radio transponder having an audio output;
means for obtaining and storing said user associated unique identification code;
a speech recognition circuit operably connected to said audio output and to said storing means; and
a visual indicator operably connected to an output of said speech recognition circuit, such that when a stored audio and said audio output are substantially the same said visual indicator is driven to activation,
wherein said means for obtaining and storing said user associated unique identification code includes an audio input device operably associated with said speech recognition circuit,
wherein said audio input device is operably connected to said speech recognition circuit, and
wherein said speech recognition circuit continues to drive said visual indicator until said audio input and said stored audio are substantially the same whereby said visual indicator remains active until said user speaks said associated unique identification code.

* * * * *